No. 881,055. PATENTED MAR. 3, 1908.
A. L. M. CHAULIN.
ELECTRICAL APPLIANCE FOR PROTECTION AGAINST INSECTS.
APPLICATION FILED JUNE 26, 1906.

WITNESSES
L. H. Grote
M. E. Keir

INVENTOR
Alphonse Louis Maurice Chaulin
BY
Howson and Howson
ATTORNEYS

UNITED STATES PATENT OFFICE.

ALPHONSE LOUIS MAURICE CHAULIN, OF PARIS, FRANCE.

ELECTRICAL APPLIANCE FOR PROTECTION AGAINST INSECTS.

No. 881,055.  Specification of Letters Patent.  Patented March 3, 1908.

Application filed June 26, 1906. Serial No. 323,495.

*To all whom it may concern:*

Be it known that I, ALPHONSE LOUIS MAURICE CHAULIN, a citizen of the French Republic, residing in Paris, Seine, France, merchant, have invented certain new and useful Improvements in Electrical Appliances for Protection Against Insects, of which invention the following is a full, clear, and exact description.

This invention has for its object improvements in electrical appliances for protection against insects, such as flies, mosquitoes, gnats, etc., these appliances consisting essentially of a series of conductors (wires, rods, chains and the like) forming a grating and connected in any appropriate manner to the positive pole of a source of electricity, and alternating with another series of conductors connected to the negative pole of the same source of electricity; the distance between a positive conductor and the negative conductor which follows it being such that the insect in endeavoring to pass between the two conductors closes the circuit by the contact of his body and is thereby electrocuted.

Hitherto the conductors utilized have always been rigid conductors with the object of keeping them parallel. This parallelism is in fact necessary, because the distance between the successive conductors being arrived at with the object stated above, it is essential that no place should furnish a passage for the insects between two successive conductors, and this passage would be facilitated if the parallelism of the conductors were not constantly maintained. Now, the employment of rigid conductors is not without its inconveniences; in the first place, they are liable to deformations which render complete and permanent parallelism of the conductors illusory and then when the appliances are not in use, either they occupy a very considerable space, or they must be dismounted. In order to obviate these defects, I employ flexible conductors, such as wires I or chains for example, on the one hand in order to obtain permanent vertical parallelism of the conductors by means of gravity, and on the other hand in order that the appliances may occupy the absolute minimum of space when they are not in use.

Figure 1:
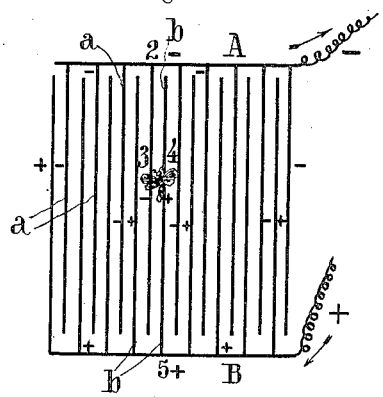
Figure 2:
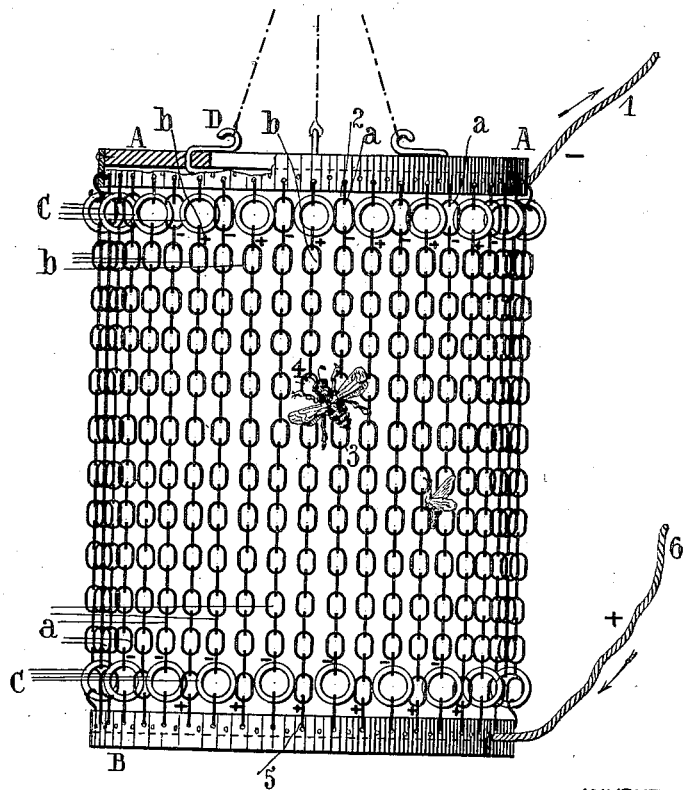

In order that the invention may be readily and clearly understood, it is represented by way of example in the accompanying drawing, in which:

Figure 1 illustrates the device diagrammatically, and Fig. 2 is an elevation partly in section of a practical constructional form of the appliance.

As shown diagrammatically in Fig. 1, the appliance comprises broadly two superposed conductors A and B preferably arranged parallelly, and to which there are electrically connected at predetermined distances conductors *a* and *b*. The conductor A is connected for example to the negative pole (−) of an appropriate source of electricity, and the conductor B to the positive pole (+) of the same source of electricity; the conductors *a* of the conductor A alternates with the conductors *b* of the conductor B and form a grating which does not permit insects to pass through it without touching at least two consecutive conductors *a*, *b*. Thus, for example, when the insect reaches the position marked in Fig. 1, its body makes contact at 3 and 4 with a conductor *a* and a conductor *b*, and it therefore closes the circuit 6, 5, 4, 3, 2, 1. The spark passes between 4, 3, and the insect is killed, or at all events paralyzed, and falls down in front of the grating A *a b* B.

Fig. 2 represents a cylindrical apparatus, which consists of an upper metallic circle A mounted upon a crown of wood A' or otherwise, and communicating, by means of a terminal for example, with the negative pole of the source of electricity, and of a lower circle B, likewise metallic, also in communication by means of a terminal with the positive pole of the said source of electricity. These two circles A, B are connected one with the other by alternating metal chains *a* and *b*. The chains *a* are fixed directly at one of their extremities to the circle A by one of their ordinary metal links, and indirectly to the circle B by the intermediary of a ring C of insulating material; in the same manner the chains *b* are directly connected to the circle B by one of their ordinary links, and indirectly to the circle A by means of an insulating ring C. This form of apparatus is particularly adapted for the interior of dwellings, and for this purpose may be suspended by means of hooks D fixed to the crown A'; in this case it is preferable to suspend inside the apparatus either a light or in the daytime a bait. In this apparatus, owing to the interposition of the insulating rings C, the circuit always remains open, and is only closed say at 4, 3 along the path 6, 5, 4, 3, 2, 1, when an insect reaches the position 4, 3. In order to prevent insects which have been killed from falling down beneath the apparatus, the circle B may be provided with an annular channel serving as a collector for the insects.

The apparatus described above is particularly characterized by its great cleanliness and the readiness with which it may be maintained, because the insects do not remain adhering to the conductors a, b, so that the device may even serve to embellish the decorative appearance of rooms or the like in which it is utilized. By employing flexible conductors and dispensing with any rigid connection between the upper and lower crowns of the apparatus, this latter may be folded in the manner of a lantern, for example, so that the space occupied by it when not in use is exceedingly small. This advantage is considerable, because it obviates the necessity for dismounting the apparatus when it is not in use, which dismounting is necessary with all appliances comprising rigid conductors.

It should be understood that without departing from the limits of this invention, any modifications not affecting its principle may be employed, and the apparatus may also be constructed of any appropriate material. Thus, instead of presenting a cylindrical form, the apparatus may be made flat, so as to form a blind or grating for windows, in such a manner as to protect the whole room from invasion by mosquitoes. In this constructional form, owing to the flexibility of the conductor, the apparatus may present the form of a blind adapted to be wound upon an upper roller when it is not in use. Finally, the circles A, B may be constructed in such a manner as to be capable of varying at will, and the distance between the conductors a b regulated; further, one of them only may carry the positive and negative terminals, and both may be arranged at the upper part. In this latter case, a circle of the insulating material is preferably employed for maintaining the conductors at their lower extremity.

1. A collapsible electrocutor for insects comprising two electrical conducting bodies, conducting chains uniting said bodies, a link of insulating material in each of said chains, in combination with means for connecting said bodies to the positive and negative poles respectively of a source of electricity.

2. An electrocutor for insects comprising two electrical conducting bodies, flexible exposed conductors suspending one of said bodies from the other, and means to prevent a completion of the circuit between said bodies through said conductors, in combination with means for connecting said bodies to the positive and negative poles respectively of a source of electricity.

In testimony whereof I have signed my name to this specification, in the presence of two subscribing witnesses.

ALPHONSE LOUIS MAURICE CHAULIN.

Witnesses:
BENJAMIN BLOCH,
AUGUSTUS E. INGRAM.